United States Patent
Patch et al.

(10) Patent No.: US 10,837,852 B2
(45) Date of Patent: Nov. 17, 2020

(54) PRESSURE SENSOR MEDIA INTERFACE WITH INTEGRATED SEAL AND DIAPHRAGM

(71) Applicant: Honeywell International Inc., Morris Plains, NJ (US)

(72) Inventors: Jason Dennis Patch, Columbus, OH (US); Paul Rozgo, Dublin, OH (US)

(73) Assignee: Honeywell International Inc, Morris Plains, NJ (US)

( * ) Notice: Subject to any disclaimer, the term of this patent is extended or adjusted under 35 U.S.C. 154(b) by 158 days.

(21) Appl. No.: 16/207,944

(22) Filed: Dec. 3, 2018

(65) Prior Publication Data
US 2019/0204173 A1    Jul. 4, 2019

Related U.S. Application Data (60) Provisional application No. 62/612,237, filed on Dec. 29, 2017.

(51) Int. Cl.
*G01L 19/06* (2006.01)
*G01L 19/14* (2006.01)
*G01L 19/00* (2006.01)

(52) U.S. Cl.
CPC ...... *G01L 19/0046* (2013.01); *G01L 19/0645* (2013.01); *G01L 19/147* (2013.01)

(58) Field of Classification Search
USPC .................................................. 73/700–756
See application file for complete search history.

(56) References Cited

U.S. PATENT DOCUMENTS

| | | | |
|---|---|---|---|
| 4,926,155 A * | 5/1990 | Colla | G01L 19/0645 338/36 |
| 5,627,321 A | 5/1997 | Korhonen et al. | |
| 5,708,245 A | 1/1998 | Werner et al. | |
| 7,568,394 B1 * | 8/2009 | Keilman | A61B 5/0215 361/283.4 |
| 7,654,655 B2 | 2/2010 | Malik et al. | |
| 8,297,127 B2 * | 10/2012 | Wade | G01L 9/0054 73/721 |
| 2010/0117308 A1 * | 5/2010 | Dell'Eva | G01L 19/141 277/628 |
| 2018/0217018 A1 * | 8/2018 | Eckhardt | G01L 19/0645 |

OTHER PUBLICATIONS

"Mazda SkyActiv Valve Controller Teardown," 4 pages, prior to Dec. 29, 2017.
"Aisin 6-speed Gen 3 transmission," 1 page, prior to Dec. 29, 2017.

* cited by examiner

*Primary Examiner* — Andre J Allen
(74) *Attorney, Agent, or Firm* — Seager Tufte & Wickhem LLP (57) ABSTRACT

An integrated seal and diaphragm member for a pressure sensor assembly may include a diaphragm portion and a seal portion integral with the diaphragm portion. In some cases, the integrated seal and diaphragm member includes one or more retention features integral with the diaphragm portion and/or the seal portion. In some cases, the seal portion may be thicker than the diaphragm portion and may extend around the perimeter of the diaphragm portion. In some instances, the seal portion may be configured to deform to form a seal with a pressure port of an external component or device without causing the diaphragm portion to move toward the pressure port in any significant way.

20 Claims, 13 Drawing Sheets

PRESSURE SENSOR MEDIA INTERFACE WITH INTEGRATED SEAL AND DIAPHRAGM

This application claims the benefit of U.S. Provisional Patent Application 62/612,237, filed Dec. 29, 2017, the disclosure of which is incorporated herein by reference.

TECHNICAL FIELD

The disclosure relates generally to pressure sensors used for sensing a pressure of a media in a pressure port, and more particularly, to an improved interface between a pressure sensor and the pressure port.

BACKGROUND

Pressure sensors are utilized in a wide variety of applications, including, for example, commercial, automotive, aerospace, industrial, and medical applications. In many applications, the operational environments in which pressure sensors are required to operate with high accuracy and repeatability can be very demanding. In addition, pressure sensors are often expected to sense and/or monitor a pressure of a harsh and/or corrosive media such as an acid, chemicals, gasoline, oil, transmission fluid, and/or other harsh media.

In many cases, a pressure sensor must interface with a pressure port of an external component or device, such as an engine, transmission, industrial piping, or other external component or device. To do so, a seal is provided between the pressure sensor and the pressure port. The seal helps contain the media while exposing the pressure sensor to the pressure of the media.

Pressure sensors often includes a pressure sense die that converts the sensed pressure to an electrical signal that can be used by external electronic circuitry such as a control system or the like. In many cases, the pressure sense die is isolated from the media by a diaphragm or the like. When so provided, the diaphragm may transmit pressure applied by the media to the pressure sense die or to an intervening pressure transmitting mechanism that transmits the pressure applied by the media to the pressure sense die. The intervening pressure transmitting mechanism may include, for example, a gel, a ball bearing and/or any other suitable pressure transmitting mechanism.

What would be desirable is an improved interface between the pressure sensor and a pressure port of an external component or device.

SUMMARY

The disclosure relates generally to pressure sensors used for sensing a pressure of a media in a pressure port, and more particularly, to an improved interface between a pressure sensor and the pressure port.

In one example, a pressure sensor assembly may include a housing, a pressure sense die secured relative to the housing, an integrated seal and diaphragm member secured relative to the housing and spaced from the pressure sense die, and a pressure transmitting mechanism interposed between a diaphragm portion of the integrated seal and diaphragm member and the pressure sense die. The diaphragm portion may be configured to transmit at least some of the pressure applied to the diaphragm portion by the media either directly or indirectly (e.g. via a pressure transmitting mechanism) to the pressure sense die. In some cases, a seal portion of the integrated seal and diaphragm member may extend around the perimeter of the diaphragm portion and may be supported by the housing when the seal portion is pressed against a pressure port to form a seal.

The integrated seal and diaphragm member may be injection molded as a single piece and may be formed of a flexible material such as a polymer or the like. In some cases, the integrated seal and diaphragm member may be formed from silicone. In some cases, the integrated seal and diaphragm member may be integrally formed from two or more different materials. For example, in some cases, a diaphragm portion may be formed from a flexible non-compressible material, and a seal portion may be formed from a flexible compressible material. Both materials may be injection molded at the same time to form a unitary piece. In some instances, the seal portion of the integrated seal and diaphragm member may be thicker than the diaphragm portion. In some cases, the seal portion may be configured to engage a pressure port of an external component or device and form a seal therewith, while the diaphragm portion is set back from the pressure port. In some cases, the seal portion may be shaped as a partial toroid extending around the perimeter of the diaphragm portion, but this is not required.

In some cases, the diaphragm portion and the housing are configured to define a cavity. The cavity may be filled with a gel or the like, with the pressure sense die exposed to the gel in the cavity. The gel may transmit a pressure applied to the gel by the diaphragm portion to the pressure sense die. The pressure sense die may converts the sensed pressure to an electrical signal that can be used by external electronic circuitry. In some cases, the integrated seal and diaphragm member may be configured so that the diaphragm portion remains in contact with the gel with no bubbles between the gel and the diaphragm portion even when the seal portion becomes deformed when forming a seal with a pressure port of an external component or device. In some cases, the integrated seal and diaphragm member is configured such that deformation of the seal portion against a pressure port of an external component or device encourages the diaphragm portion to remaining in contact with the gel or at least not pull away from the gel, and perhaps increases the lateral tension of the diaphragm portion across the cavity.

In some cases, the integrated seal and diaphragm member may include one or more retention features that form an interference connection with one or more retention features of the housing. This may allow for easier assembly of the integrated seal and diaphragm member with the housing. In some cases, the housing may include a base and a cap, with the cap secured to the base. In some cases, the cap may include one or more retention features for forming an interference connection with the one or more retention features of the integrated seal and diaphragm member. In other cases, the housing may be a one-piece housing.

In some cases, the pressure sensor assembly may include a printed circuit board secured relative to the housing. When so provided, the pressure sense die may be mounted to the printed circuit board. In some cases, the printed circuit board may be considered as part of the housing or may be considered as a separate component. The printed circuit board may be positioned to expose the pressure sensor die to the pressure transmitting mechanism (e.g. gel).

In another example, a pressure sensor assembly may include a body defining a cavity that has an open top, a pressure sense die secured relative to the body and exposed to the cavity, an integrated seal and diaphragm member secured relative to the body so as to close the open top of the cavity, and a gel in the cavity interposed between ae diaphragm portion of the integrated seal and diaphragm member and the pressure sense die. In some cases, a seal portion of the integrated seal and diaphragm member may extend around the perimeter of the cavity so as to be supported by the body, and the diaphragm portion may extend over the open top of the cavity.

In another example, an integrated seal and diaphragm member for a pressure sensor assembly may include a diaphragm portion, a seal portion integral with the diaphragm portion, and one or more retention features integral with the diaphragm portion and/or the seal portion. In some cases, the seal portion may be thicker than the diaphragm portion and may extend around the perimeter of the diaphragm portion. In some cases, the one or more retention features may be configured to form an interference connection with one or more retention features of a pressure sensor assembly. In some instances, the seal portion may be configured to deform to form a seal with a pressure port of an external component or device without causing the diaphragm portion to move toward the pressure port in any significant way.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

DESCRIPTION

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Figure 1A:
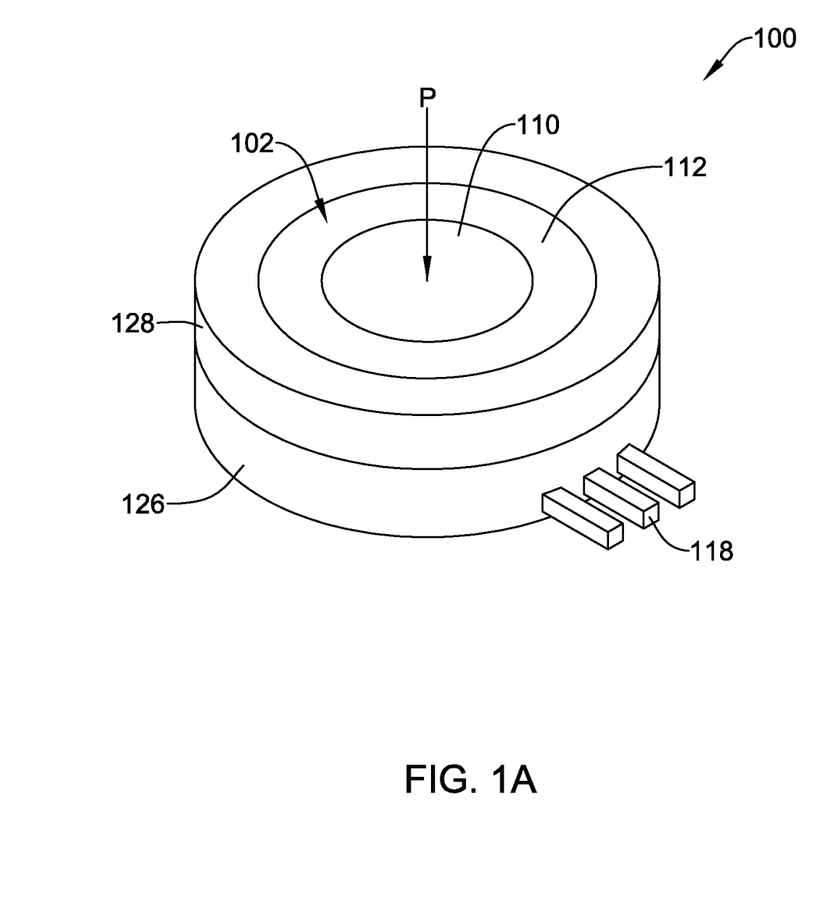
FIG. 1A is a perspective view of an illustrative pressure sensor assembly with an integrated seal and diaphragm member.
Figure 1B:
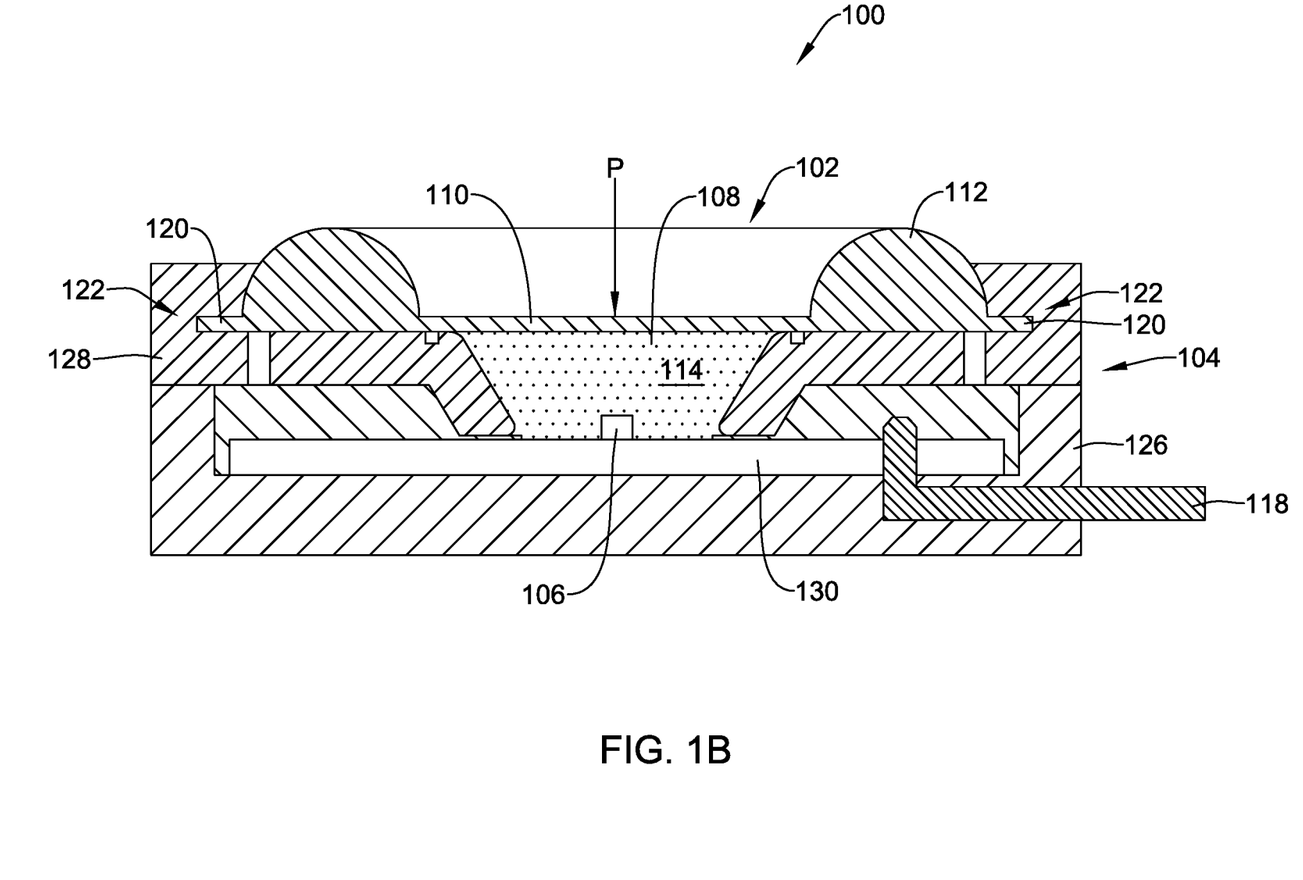
FIG. 1B is a schematic cross-sectional side view of the illustrative pressure sensor assembly of FIG. 1A.
Figure 1C:
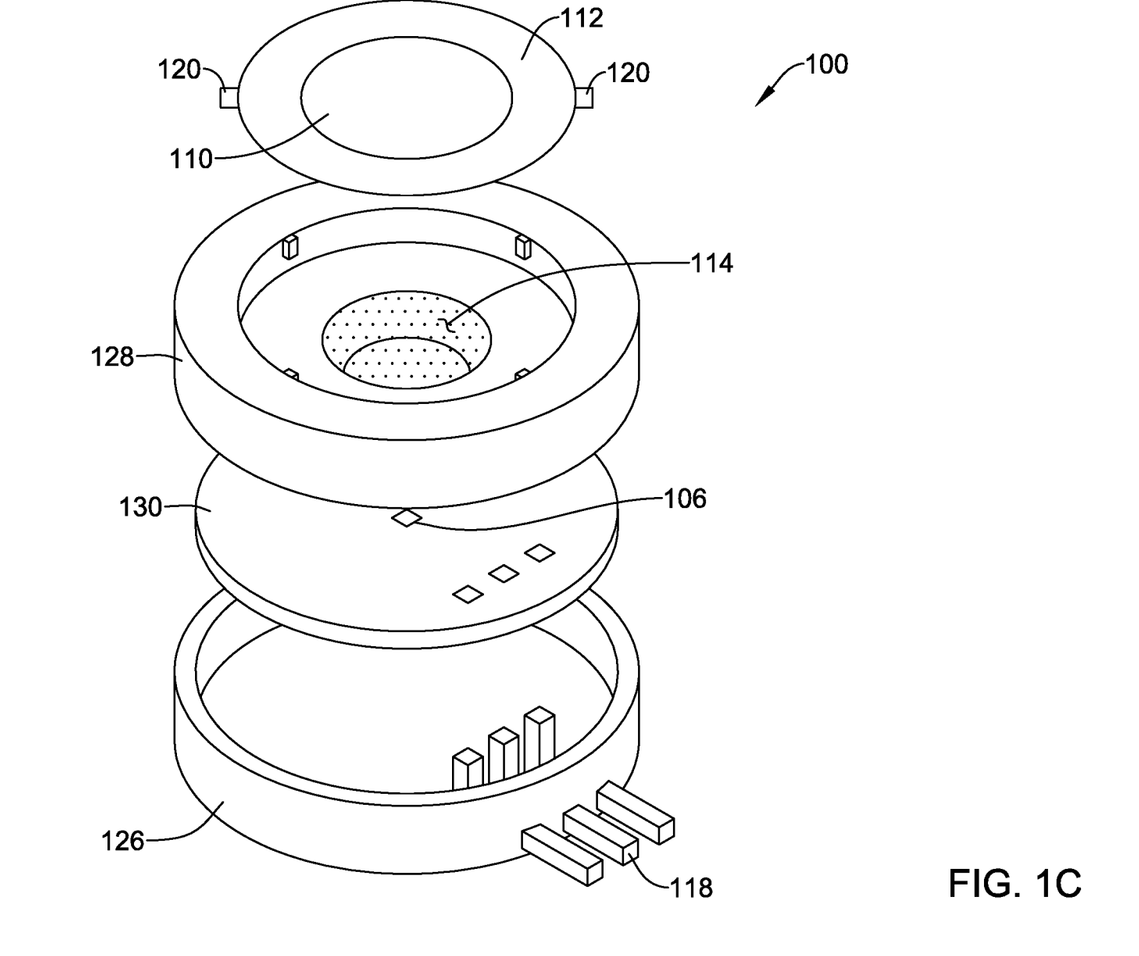
FIG. 1C is a exploded perspective view of the illustrative pressure sensor assembly of FIG. 1A.

FIG. 1A is a perspective view of an illustrative pressure sensor assembly 100 with an integrated seal and diaphragm member 102. FIG. 1B is a schematic cross-sectional side view of the illustrative pressure sensor assembly 100 of FIG. 1A, and FIG. 1C is a exploded perspective view of the illustrative pressure sensor assembly 100 of FIG. 1A. The illustrative pressure sensor assembly 100 includes a housing 104, a pressure sense die 106 secured relative to the housing 104, and an integrated seal and diaphragm member 102 secured relative to the housing 104 and spaced from the pressure sense die 106. A pressure transmitting mechanism 108 may be interposed between a diaphragm portion 110 of the integrated seal and diaphragm member 102 and the pressure sense die 106 for transmitting at least some of the pressure P applied to the diaphragm portion 110 by the media to the pressure sense die 106. In some cases, a seal portion 112 of the integrated seal and diaphragm member 102 may extend around the perimeter of the diaphragm portion 110 as shown.

The integrated seal and diaphragm member 102 may be injection molded as a single piece and may be formed of a flexible material such as a polymer. In some cases, the integrated seal and diaphragm member 102 may be formed from silicone. In some cases, the integrated seal and diaphragm member 102 may be integrally formed from two or more different materials. For example, in some cases, the diaphragm portion 110 may be formed from a flexible non-compressible material, and the seal portion 112 may be formed from a flexible compressible material. Both materials may be injection molded at the same time to form a unitary piece. In some instances, the seal portion 112 of the integrated seal and diaphragm member 102 may be thicker than the diaphragm portion 110 as shown. In some cases, the seal portion 112 may be configured to engage a pressure port of an external component or device (not explicitly shown) and form a seal therewith, while the diaphragm portion 110 remains set back from the pressure port. In some cases, the seal portion 112 may be shaped as a partial (e.g. ¼, ⅓, ½, ¾, etc.) toroid extending around the perimeter of the diaphragm portion 110, but this is not required.

In some cases, the diaphragm portion 110 and the housing 104 are configured to define a cavity 114. A pressure transmitting mechanism 108 may be transmit a pressure P applied to the diaphragm portion 110 to the pressure sense die 106. It is contemplated that the pressure transmitting mechanism 108 may include, for example, a ball bearing and/or any other suitable pressure transmitting mechanism. In some cases, the pressure transmitting mechanism 108 may include a gel that fills the cavity 114 as indicated by the dot pattern, with the pressure sense die 106 exposed to the gel in the cavity 114. The gel may transmit the pressure P applied to the gel by the diaphragm portion 110 to the pressure sense die 106. The pressure sense die 106 may then converts the sensed pressure or force to an electrical signal that can be delivered via connector pins 118 to external electronic circuitry. In some cases, the integrated seal and diaphragm member 102 may be configured so that the diaphragm portion 110 remains in contact with the gel in the cavity 114 with no bubbles between the gel and the diaphragm portion 110 even when the seal portion 112 becomes deformed when forming a seal with a pressure port of an external component or device. In some cases, the integrated seal and diaphragm member 102 is configured such that deformation of the seal portion 112 against a pressure port of an external component or device encourages the diaphragm portion 110 to remaining in contact with the gel or at least not pull away from the gel 108, and perhaps increases the lateral tension of the diaphragm portion 110 across the cavity 114.

In some cases, the integrated seal and diaphragm member 102 may include one or more retention features 120 that form an interference connection with one or more retention features 122 (e.g. slot) of the housing 104. This may allow for easier assembly of the integrated seal and diaphragm member 102 with the housing 104. In some cases, the housing 104 may include a base 126 and a cap 128, wherein the cap 128 is secured to the base 126. In some cases, the cap 128 includes one or more retention features 122 for forming an interference connection with one or more retention features 120 of the integrated seal and diaphragm member 102. In other cases, the housing 104 may be a one-piece housing (see FIG. 2) and one or more retention features 222 may be provided by the one-piece housing 104.

In some cases, a printed circuit board 130 or the like may be secured relative to the housing 104, and the pressure sense die 106 may be mounted to the printed circuit board 130. The printed circuit board 130 may be considered to be part of the housing 104 or may be considered to be a separate component. The printed circuit board 130 may be positioned to expose the pressure sense die 106 to the pressure transmitting mechanism (e.g. gel in the cavity 114). In the example shown in FIGS. 1A-1C, the printed circuit board 130 is insert molded within the housing 104, and may be considered part of the housing 104, and may define part of the cavity 114.

More generally, the pressure sensor assembly 100 may include a body (e.g. housing 104) defining the cavity 114 with an open top. The pressure sense die 106 may be secured relative to the body (housing 104) and may be exposed to the cavity 114 as shown. The integrated seal and diaphragm member 102 may be secured relative to the body so as to close the open top of the cavity 114. A gel may be placed in the cavity 114, interposed between the diaphragm portion 110 of the integrated seal and diaphragm member 102 and the pressure sense die 106. In some cases, the seal portion 112 may extend around the perimeter of the cavity 114 and around the diaphragm portion 110, and the diaphragm portion 110 may extend over the open top of the cavity 114 as shown. In some cases, the seal portion 112 rests against and is supported by the body when the seal portion 112 is pressed against a pressure port to form a seal.

As detailed above, the integrated seal and diaphragm member 102 may include a diaphragm portion 110, a seal portion 112 integral with the diaphragm portion 110, and in some cases one or more retention features 120 integral with the diaphragm portion 110 and/or the seal portion 112. In some cases, the seal portion 112 may be thicker than the diaphragm portion 110 and may extend around the perimeter of the diaphragm portion 110. In some cases, the one or more retention features 120 may be configured to form an interference connection with one or more retention features 122 of a pressure sensor assembly. In some instances, the seal portion 112 may be configured to deform to form a seal with a pressure port of an external component or device without causing the diaphragm portion 110 to move toward the pressure port in any significant way (e.g. less than 2 mm maximum deflection toward the pressure port).

Figure 2:
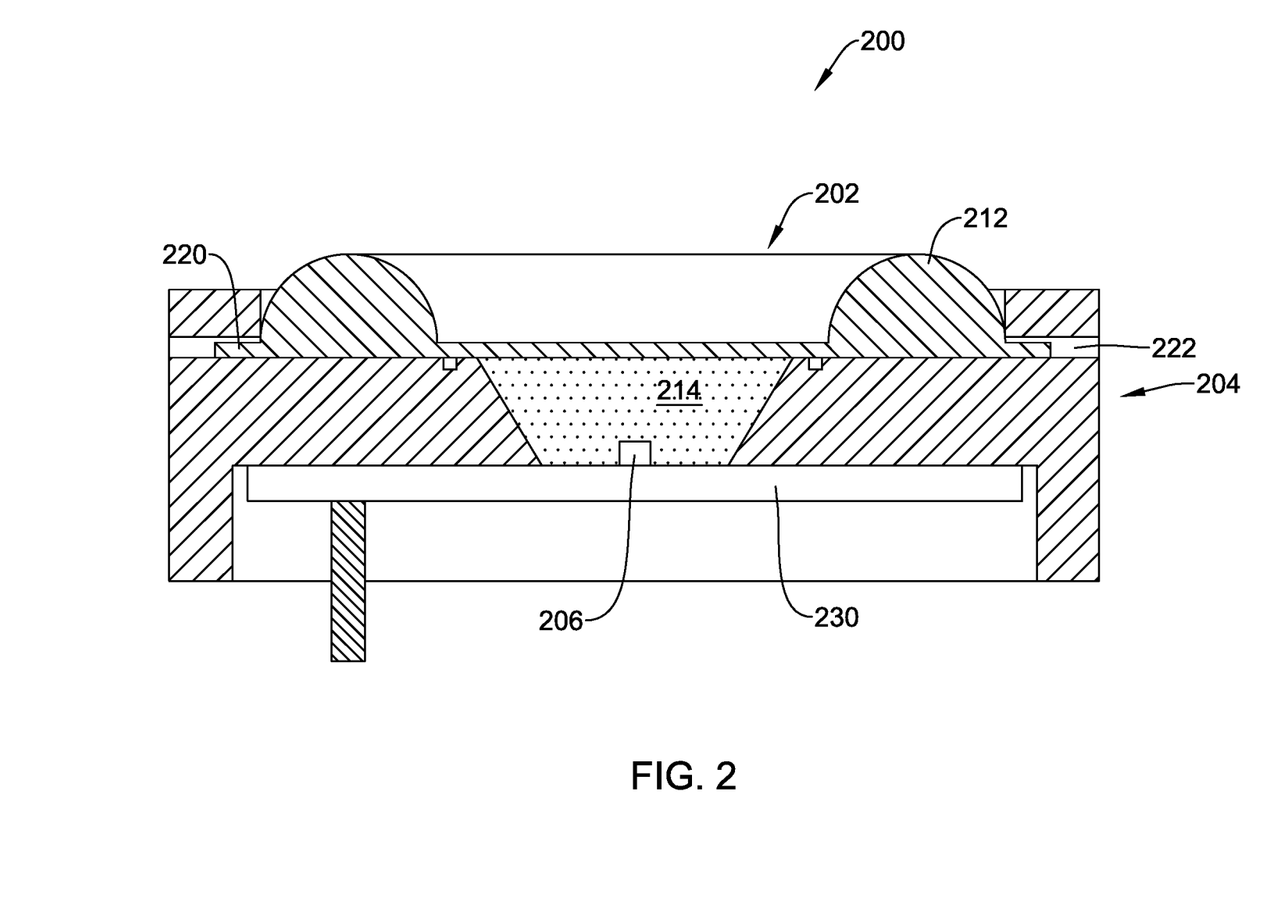
FIG. 2 is a schematic cross-sectional side view of another example pressure sensor assembly with an integrated seal and diaphragm member.

FIG. 2 is a schematic cross-sectional side view of another example pressure sensor assembly 200 with an integrated seal and diaphragm member 202. The illustrative pressure sensor assembly 200 is similar to the pressure sensor assembly 100 shown in FIGS. 1A-1C, except that the housing 204 is shown as a one-piece housing. Also, the printed circuit board 230 is not insert molded within the housing 204, but rather is mounted to the back of the housing 104 and in some cases forms the back of the cavity 214. The printed circuit board 230 may be considered to be part of the housing 204 or may be considered to be a separate component. The printed circuit board 230 may be positioned to expose the pressure sensor die 206, which is mounted to the printed circuit board 230, to the pressure transmitting mechanism (e.g. a gel in the cavity 214).

Figure 3A:
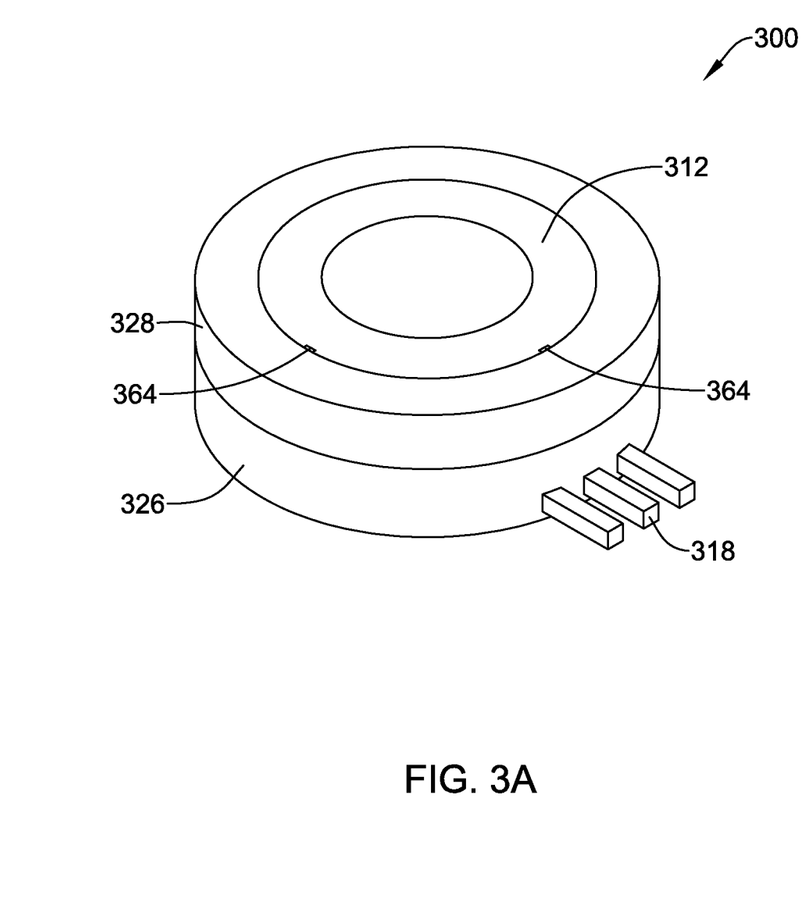
FIG. 3A is a perspective view of another illustrative pressure sensor assembly with an integrated seal and diaphragm member.
Figure 3B:
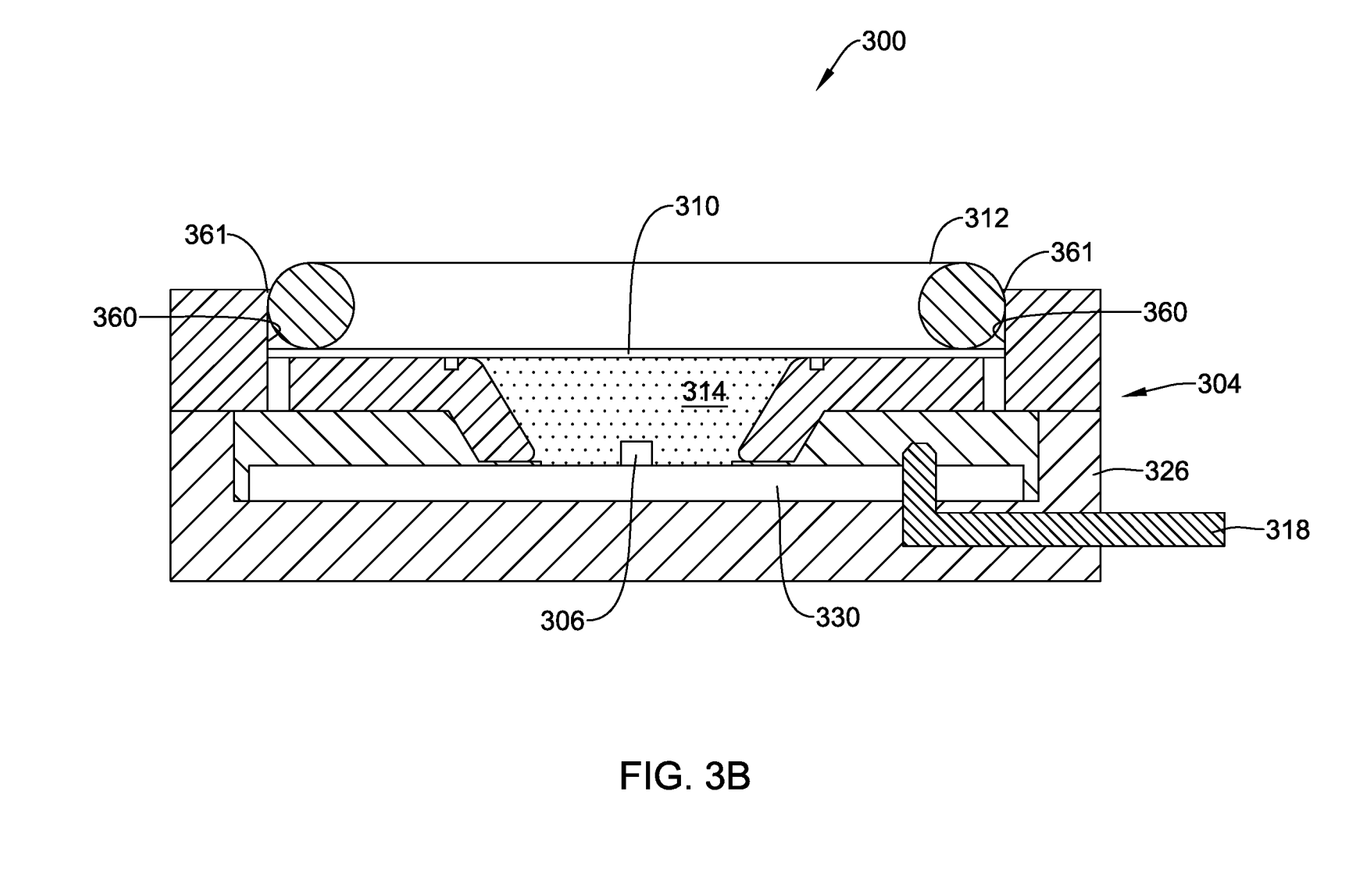
FIG. 3B is a schematic cross-sectional side view of the illustrative pressure sensor assembly of FIG. 3A.
Figure 3C:
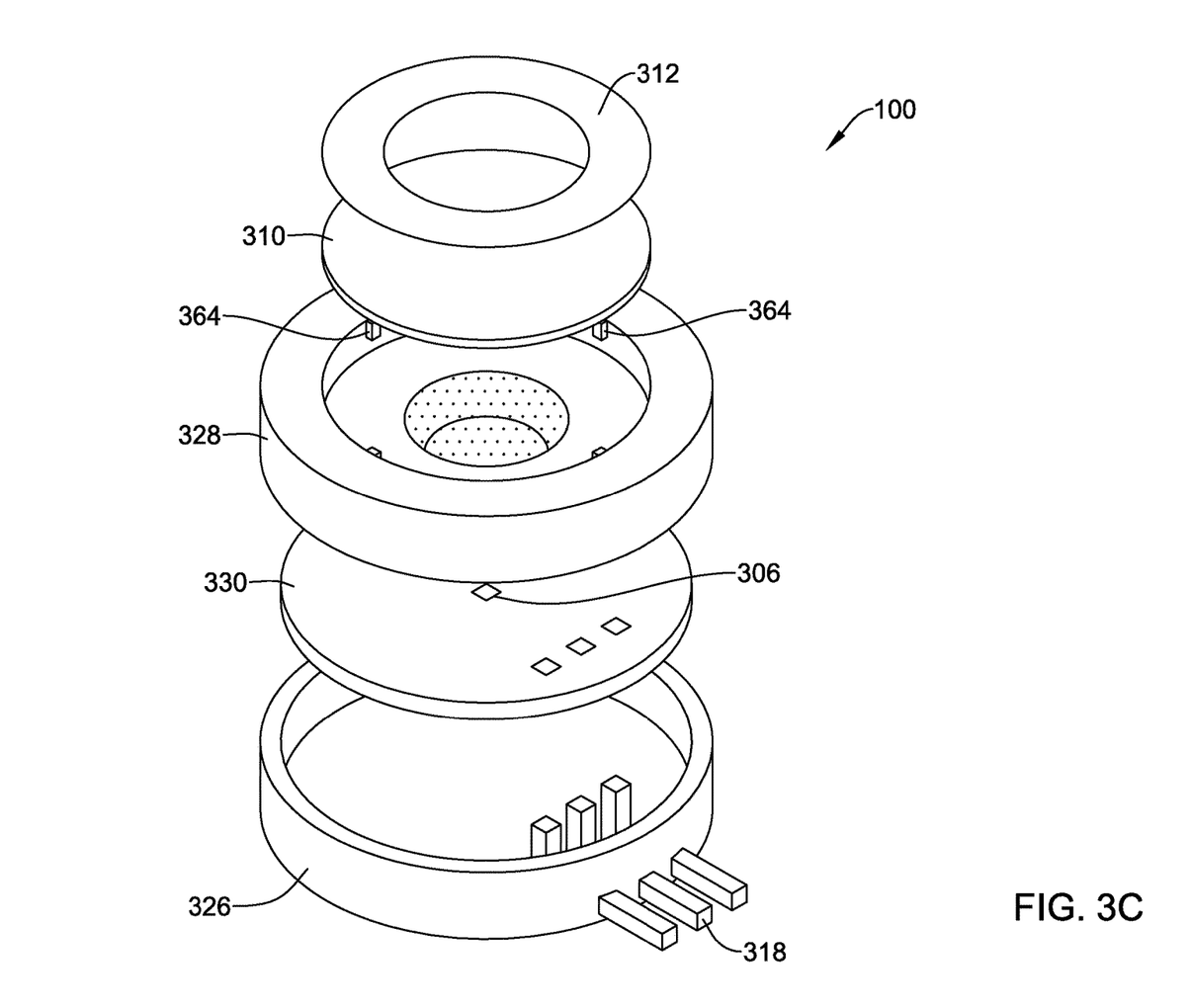
FIG. 3C is a exploded perspective view of the illustrative pressure sensor assembly of FIG. 3A.

FIG. 3A is a perspective view of another illustrative pressure sensor assembly 300 with an integrated seal and diaphragm member. FIG. 3B is a schematic cross-sectional side view of the illustrative pressure sensor assembly 300 of FIG. 3A, and FIG. 3C is a exploded perspective view of the illustrative pressure sensor assembly 300 of FIG. 3A. The illustrative pressure sensor assembly 300 is similar to the pressure sensor assembly 100 shown in FIGS. 1A-1C, except that the seal 312 is a separate component from the diaphragm 310. That is, the seal 312 and diaphragm 310 are not integrated. This illustrative pressure sensor assembly 300 may be more difficult to assembly than that shown in FIGS. 1A-1C. In the example shown in FIGS. 3A-3C, the seal 312 may be an O-ring seal 312 that is partially inset within a cavity defined in the housing 304. The cavity of the housing 304 may be defined by lateral edges 360 that may extend inward at or near the top (in the orientation of FIG. 3B) as shown at 361 in order to reduce the lateral dimension of the cavity at or near the top to help hold the O-ring seal 312 within the cavity once installed. In some cases, rather than the entire circumference of the cavity extending inward, spaced tabs 364 (see FIG. 3C) may be provided that extend inward to help retain the O-ring seal 312 within the cavity. During assembly, the diaphragm 310 may be placed in the cavity, followed by the O-ring seal 312. The O-ring seal 312 may be pressed past the inward extending tabs 364 (or inward extending walls) of the housing 304 so that the diaphragm 310 and O-ring seal 312 are retained within the cavity of the housing 304. Part of the O-ring seal 312 may remain outside of the housing 304 to engage and form a seal with a pressure port of an external component or device.

Figure 4A:
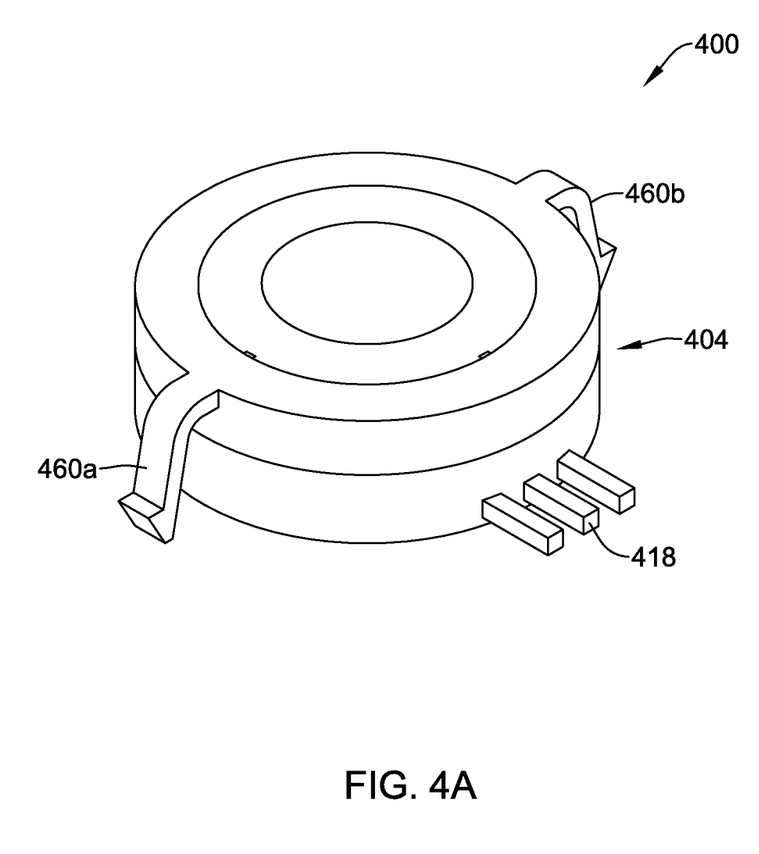
FIG. 4A is a perspective view of another illustrative pressure sensor assembly with a mounting structure for mounting the pressure sensor assembly to an external component or device.
Figure 4B:
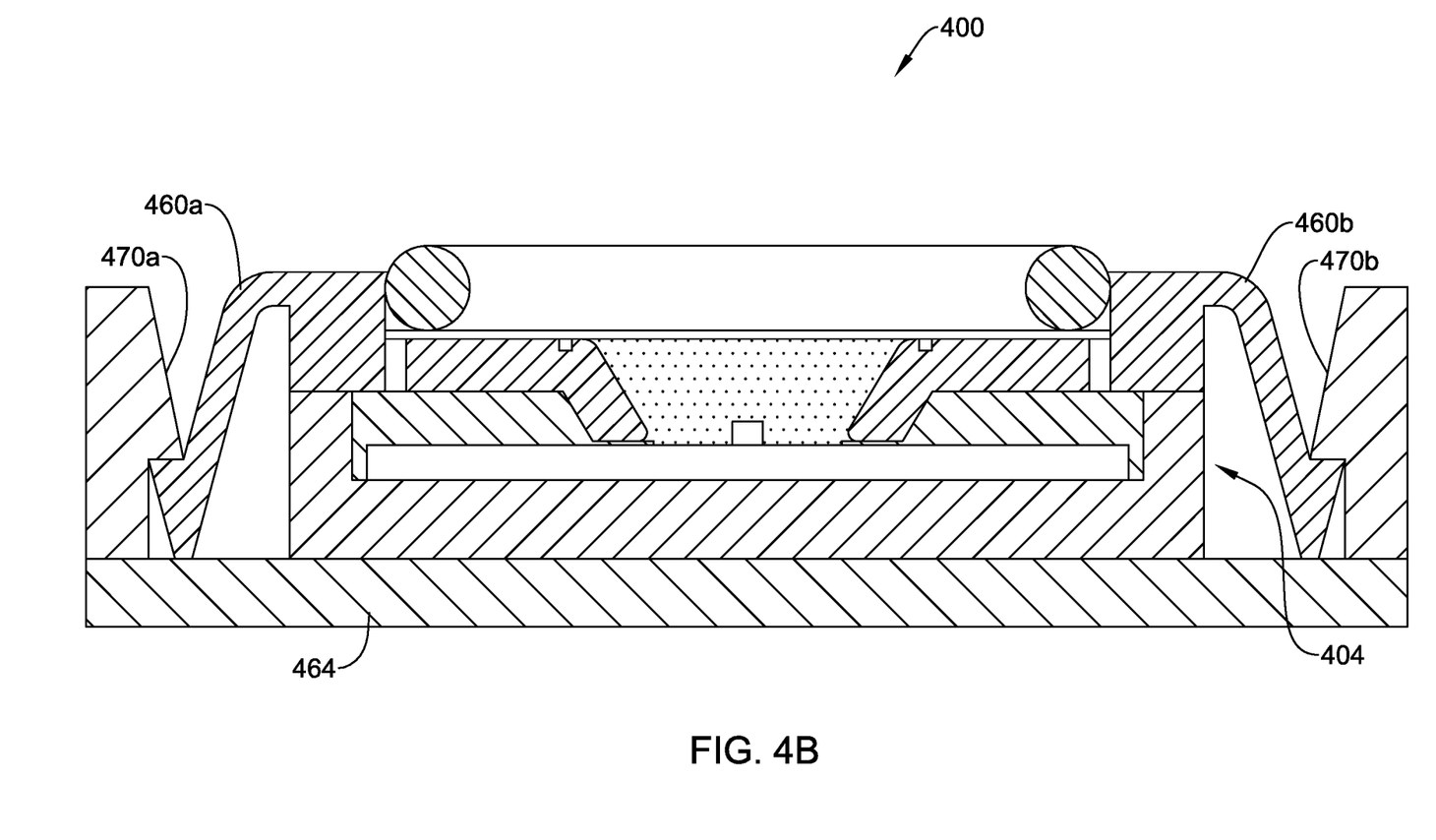
FIG. 4B is a schematic cross-sectional side view of the illustrative pressure sensor assembly of FIG. 4A mounted to an external component or device.

FIGS. 4A-6B are schematic cross-sectional side views of illustrative mounting structures for mounting pressure sensor assemblies, such as those shown in FIGS. 1-3, to an external component or device. FIG. 4A is a perspective view of an illustrative pressure sensor assembly with a mounting structure for mounting the pressure sensor assembly to an external component or device. FIG. 4B is a schematic cross-sectional side view of the illustrative pressure sensor assembly of FIG. 4A mounted to an external component or device. In FIGS. 4A-4B, the housing 404 includes opposing wing-clips 460a and 460b. While two wing-clips 460a and 460b are shown, it is contemplated more or less wing clips may be provided. The two wing-clips 460a and 460b may be configured to bend inward when the pressure sensor assembly 400 is pressed into a receiving receptacle 464 (see FIG. 4B), and may snap outward to engage engaging features 470a and 470b of the receptacle 464, respectively. This may provide an easy yet secure way to mount the pressure sensor assembly 400. It is contemplated that any of the example pressure sensor assemblies of FIGS. 1A-3C may be mounted using such wing-clips 460a and 460b.

Figure 5A:
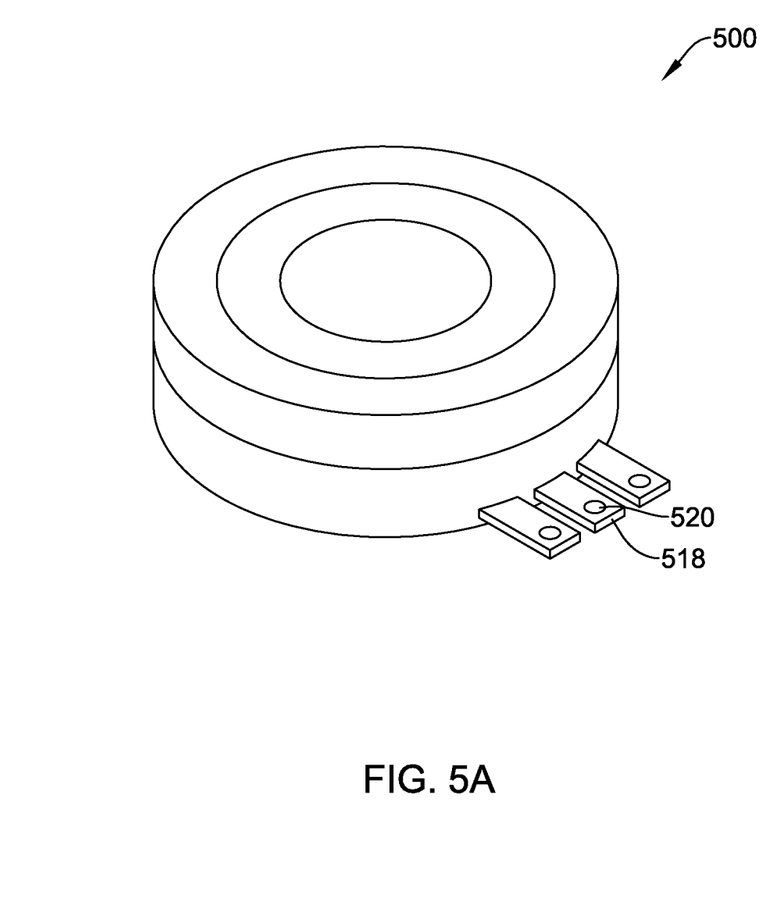
FIG. 5A is a perspective view of another illustrative pressure sensor assembly with a mounting structure for mounting the pressure sensor assembly to an external component or device.
Figure 5B:
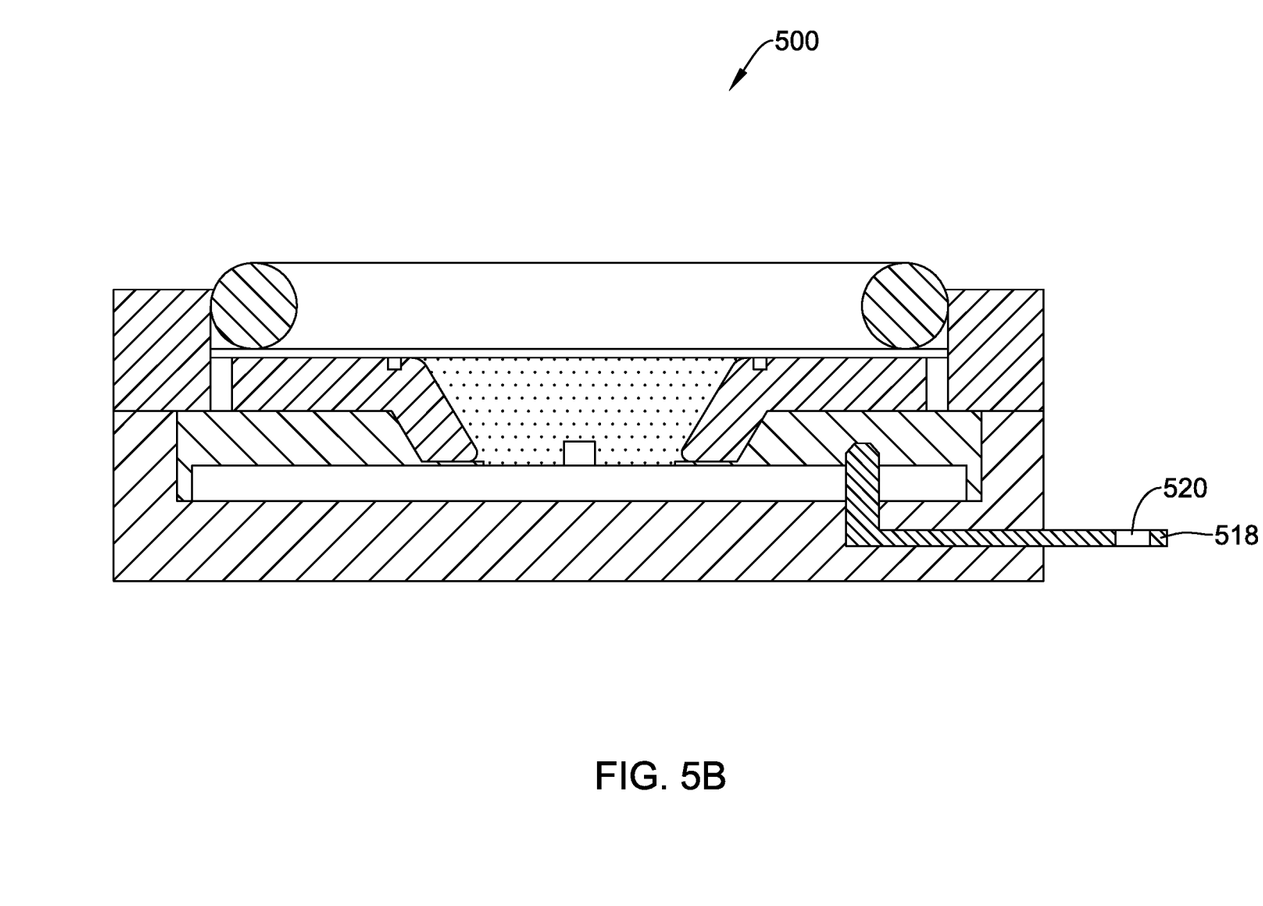
FIG. 5B is a schematic cross-sectional side view of the illustrative pressure sensor assembly of FIG. 5A.

FIG. 5A is a perspective view of another illustrative pressure sensor assembly 500 with a mounting structure for mounting the pressure sensor assembly to an external component or device. FIG. 5B is a schematic cross-sectional side view of the illustrative pressure sensor assembly 500 of FIG. 5A. The illustrative pressure sensor assembly 500 may include connector pins 518 extending away from the housing. One or more of the connector pints 518 may include rivet apertures 520. When so provided, the illustrative pressure sensor assembly 500 may be mounted to an external component or device via rivets that pass through the rivet apertures 520 as shown.

Figure 6A:
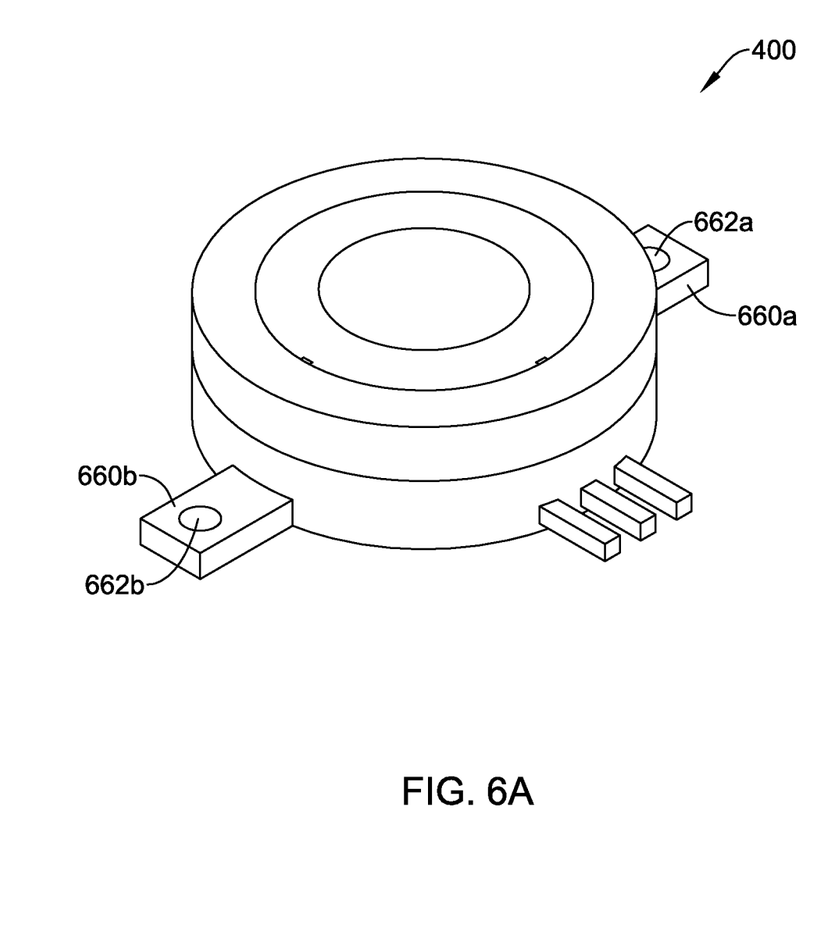
FIG. 6A is a perspective view of another illustrative pressure sensor assembly with a mounting structure for mounting the pressure sensor assembly to an external component or device.
Figure 6B:
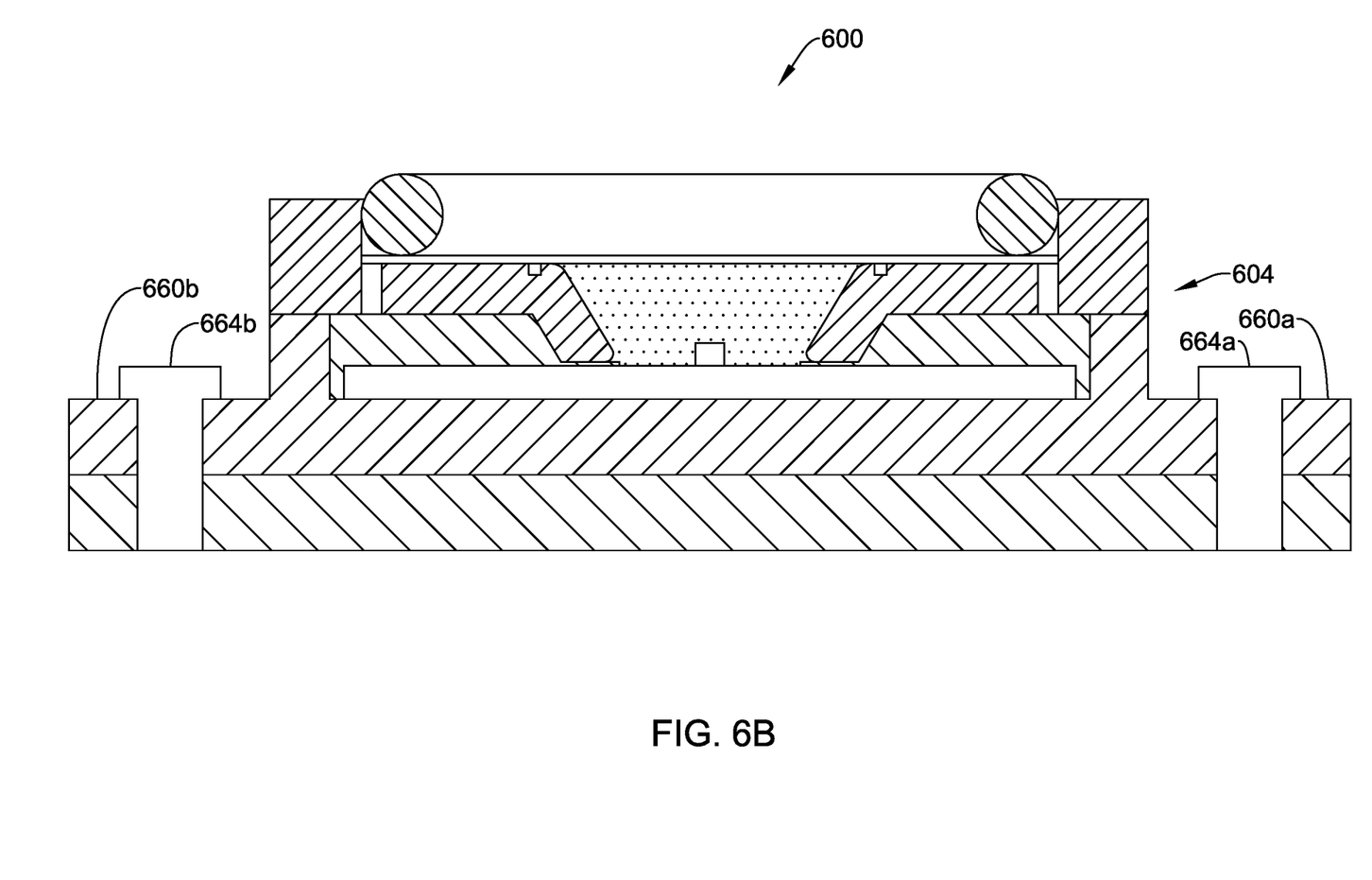
FIG. 6B is a schematic cross-sectional side view of the illustrative pressure sensor assembly of FIG. 6A mounted to an external component or device.

FIG. 6A is a perspective view of another illustrative pressure sensor assembly 600 with another mounting structure for mounting the pressure sensor assembly 600 to an external component or device. FIG. 6B is a schematic cross-sectional side view of the illustrative pressure sensor assembly 600 of FIG. 6A mounted to an external component or device. In FIGS. 6A-6B, the illustrative pressure sensor assembly 600 may include a housing 604 that includes opposing mounting tabs 660a and 660b. While two mounting tabs 660a and 660b are shown, it is contemplated more or less mounting tabs may be provided. Each of the two mounting tabs 660a and 660b may include an aperture 662a and 662b, respectively. Heat stakes 664a and 664b, screws or any other fastener, may pass through each of the aperture 662a and 662b to heat stake (other otherwise mount) the pressure sensor assembly 600 to a mounting surface.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A pressure sensor assembly for sensing a pressure of a media, comprising:
    a housing;
    a pressure sense die secured relative to the housing;
    an integrated seal and diaphragm member secured relative to the housing and spaced from the pressure sense die, wherein a seal portion of the integrated seal and diaphragm member extends around the perimeter of a diaphragm portion of the integrated seal and diaphragm member; and
    a pressure transmitting mechanism interposed between the diaphragm portion of the integrated seal and diaphragm member and the pressure sense die for transmitting at least some of the pressure applied to the diaphragm portion by the media to the pressure sense die.

2. The pressure sensor assembly of claim 1, wherein the integrated seal and diaphragm member is a single piece.

3. The pressure sensor assembly of claim 1, wherein the integrated seal and diaphragm member is a single piece formed from a polymer.

4. The pressure sensor assembly of claim 1, wherein the seal portion of the integrated seal and diaphragm member is thicker than the diaphragm portion of the integrated seal and diaphragm member.

5. The pressure sensor assembly of claim 4, wherein the seal portion is configured to engage a pressure port of an external component or device and form a seal, while the diaphragm portion is set back from the pressure port.

6. The pressure sensor assembly of claim 1, wherein the diaphragm portion and the housing are configured to define a cavity, wherein the pressure transmitting mechanism comprises a gel that fills the cavity and the pressure sense die is exposed to the gel in the cavity.

7. The pressure sensor assembly of claim 6, wherein the integrated seal and diaphragm member is configured so that the diaphragm portion remains in contact with the gel with no bubbles between the gel and the diaphragm portion even when the seal portion deforms to form a seal with a pressure port of an external component or device.

8. The pressure sensor assembly of claim 7, wherein the integrated seal and diaphragm member is configured such that deformation of the seal portion against a pressure port of an external component or device encourages the diaphragm portion to remaining in contact with the gel.

9. The pressure sensor assembly of claim 7, wherein the integrated seal and diaphragm member is configured such that deformation of the seal portion against a pressure port of an external component or device does not cause the diaphragm portion to pull away from the gel.

10. The pressure sensor assembly of claim 1, wherein the seal portion is shaped as a partial toroid extending around the perimeter of the diaphragm portion.

11. The pressure sensor assembly of claim 1, wherein the integrated seal and diaphragm member comprises one or more retention features that form an interference connection with one or more retention features of the housing.

12. The pressure sensor assembly of claim 11, wherein the housing comprises a base and a cap, wherein the cap is secured to the base, and wherein the cap comprises the one or more retention features of the housing.

13. A pressure sensor assembly for sensing a pressure of a media in a pressure port of an external component or device, comprising:
    a body defining a cavity with an open top;
    a pressure sense die secured relative to the body and exposed to the cavity;
    an integrated seal and diaphragm member secured relative to the body closing the open top of the cavity;
    a gel in the cavity interposed between a diaphragm portion of the integrated seal and diaphragm member and the pressure sense die.

14. The pressure sensor assembly of claim 13, wherein a seal portion of the integrated seal and diaphragm member extends around the perimeter of the cavity, and the diaphragm portion extends over the open top of the cavity.

15. The pressure sensor assembly of claim 14, wherein the seal portion is supported by the body when the seal portion is pressed against the pressure port of an external component or device to form a seal.

16. The pressure sensor assembly of claim 13, wherein a seal portion of the integrated seal and diaphragm member is thicker than the diaphragm portion and is deformable to form a seal with the pressure port of the external component or device.

17. The pressure sensor assembly of claim 16, wherein deformation of the seal portion against the pressure port of the external component or device does not cause the diaphragm portion to pull away from the gel in the cavity.

18. An integrated seal and diaphragm for a pressure sensor assembly, comprising:
  a diaphragm portion;
  a seal portion integral with the diaphragm portion, the seal portion is thicker than the diaphragm portion and extends around the perimeter of the diaphragm portion; and
  one or more retention features integral with the diaphragm portion and/or the seal portion, the one or more retention features are configured to form an interference connection with one or more retention features of a pressure sensor assembly.

19. The integrated seal and diaphragm of claim 18, wherein the seal portion is configured to deform to form a seal with a pressure port of an external component or device.

20. The integrated seal and diaphragm of claim 19, wherein the seal portion is configured to deform to form the seal with a pressure port of an external component or device without causing the diaphragm portion to move toward the pressure port.

* * * * *